(12) United States Patent
Kämper

(10) Patent No.: US 6,357,978 B1
(45) Date of Patent: Mar. 19, 2002

(54) LOAD INDICATOR ON TRACTION ELEMENTS

(75) Inventor: Hans-Werner Kämper, Aldenhoven (DE)

(73) Assignee: Spanset Inter AG, Oetwil am See (CH)

( * ) Notice: Subject to any disclaimer, the term of this patent is extended or adjusted under 35 U.S.C. 154(b) by 0 days.

(21) Appl. No.: 09/424,922

(22) PCT Filed: May 7, 1998

(86) PCT No.: PCT/EP98/02747

§ 371 Date: Dec. 1, 1999

§ 102(e) Date: Dec. 1, 1999

(87) PCT Pub. No.: WO98/55341

PCT Pub. Date: Dec. 10, 1998

(30) Foreign Application Priority Data

Jun. 3, 1997 (DE) .......................................... 197 24 227
Dec. 19, 1997 (EP) ............................................. 97250377

(51) Int. Cl.⁷ ................................................. B60P 7/08
(52) U.S. Cl. ......................................... 410/100; 410/97
(58) Field of Search ........................... 410/96, 97, 100; 24/300, 301, 265 CD, 68 CD; 267/158; 248/499

(56) References Cited

U.S. PATENT DOCUMENTS

| | | | | |
|---|---|---|---|---|
| 5,026,230 A | * | 6/1991 | Dolezych et al. | 410/100 |
| 5,288,187 A | * | 2/1994 | Ward | 410/100 |
| 5,908,274 A | * | 6/1999 | Silberman | 410/100 X |
| 6,048,145 A | * | 4/2000 | Pedesen | 410/100 |

FOREIGN PATENT DOCUMENTS

| | | |
|---|---|---|
| DE | 32 48 789 | 7/1984 |
| DE | 94 06 818 | 8/1994 |
| FR | 2 253 209 | 6/1975 |
| GB | 2 223 102 | 3/1990 |
| GB | 2 255 109 | 10/1992 |

* cited by examiner

Primary Examiner—Stephen T. Gordon
(74) Attorney, Agent, or Firm—Venable; Gabor J. Kelemen

(57) ABSTRACT

The invention relates to a load indicator for indicating the tensile stress on traction elements, especially on a lashing strap or rope. A loop or eyelet is provided in the traction element for catching an adaptation part, e.g. a shackle or a bracing ratchet with a bolt as the stopping element. Said adaptation element introduces a counter-retention force to the traction element. The load indicator is positioned in the loop or eyelet, so that it rests on the opposite inner flanks thereof, and expands said loop/eyelet slightly when there is zero stress on the traction element. Said load indicator comprises an indicator body which can be compressed in a crosswise direction to the longitudinal course of the inner flanks of the traction element eyelet, and contains contact areas which act upon the inner flanks of the traction element eyelet. The distance between said contact areas acts as a load indicator.

10 Claims, 6 Drawing Sheets

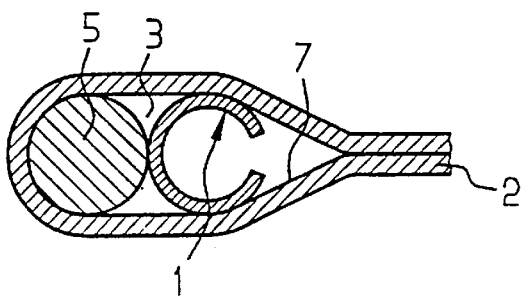
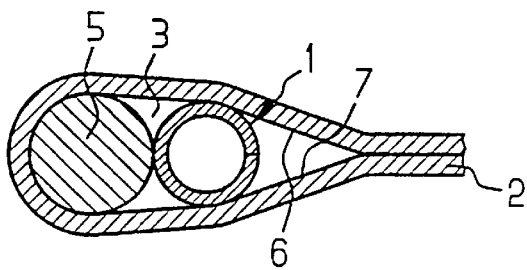
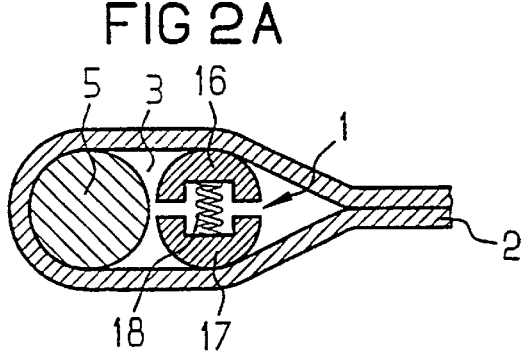
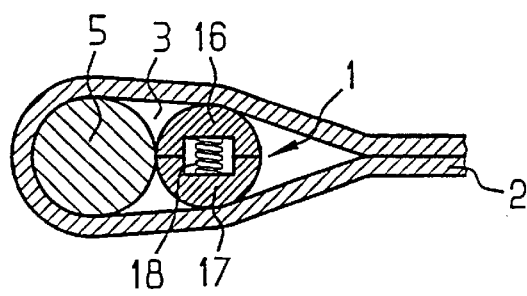
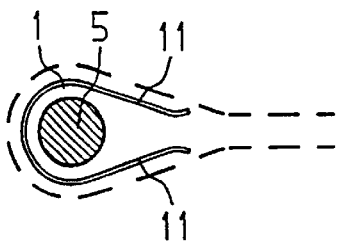
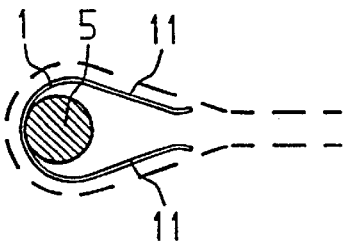
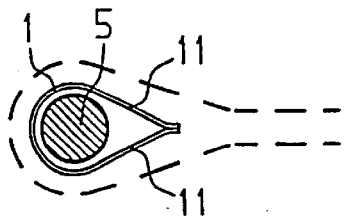

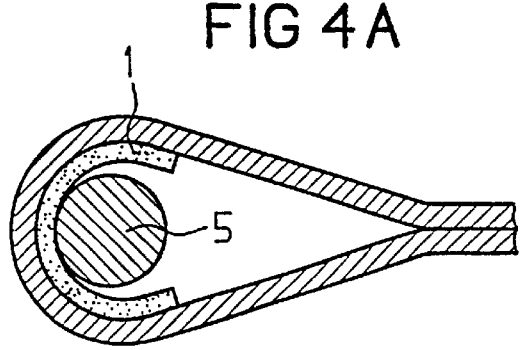
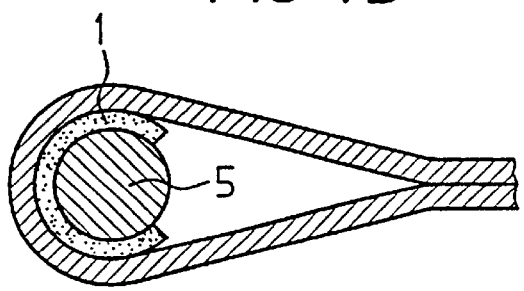
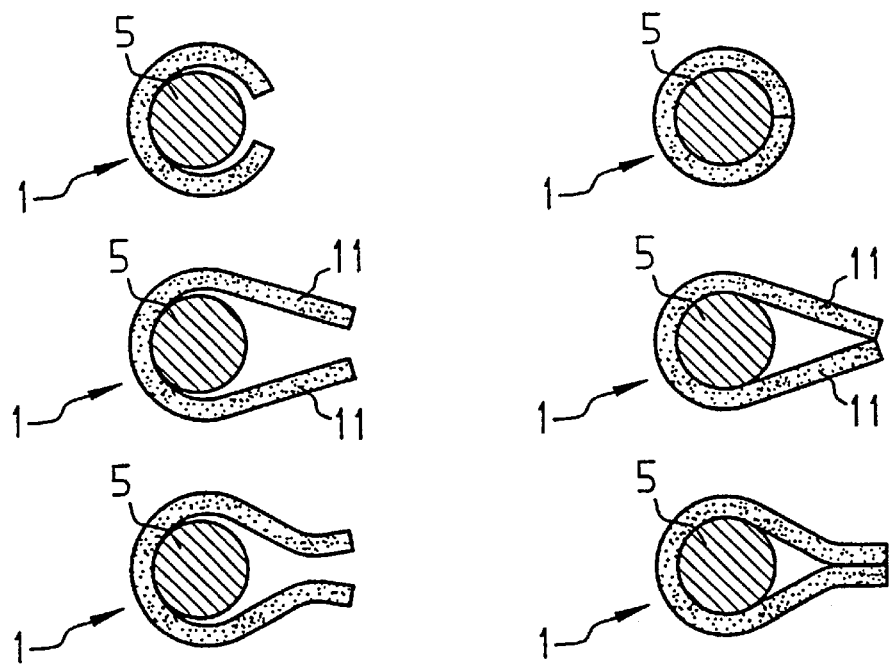

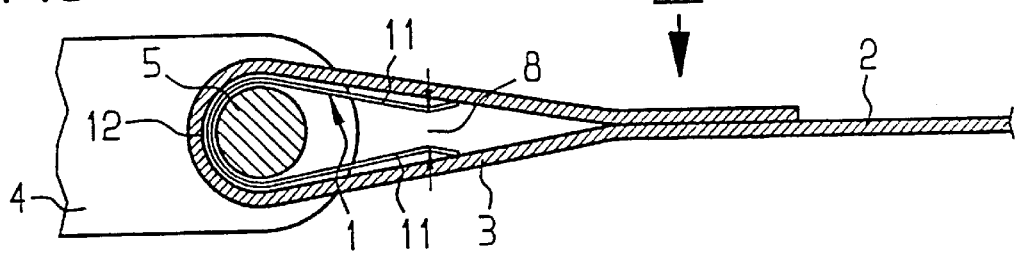
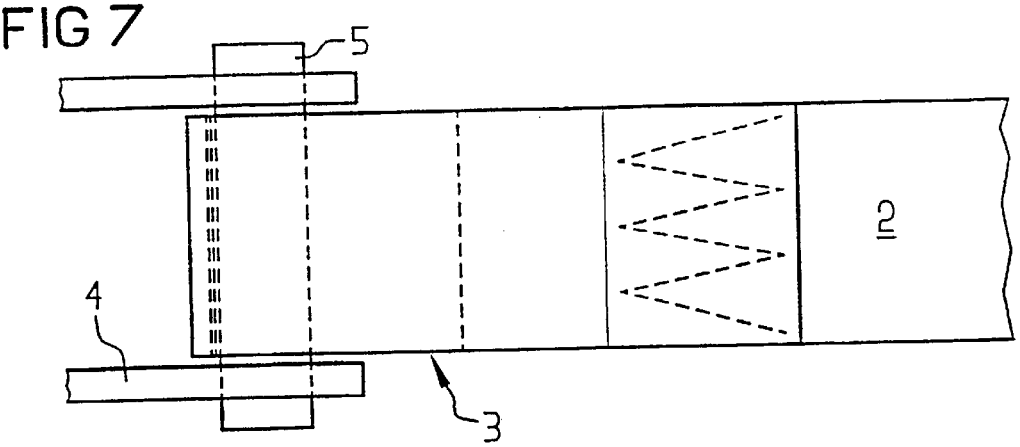
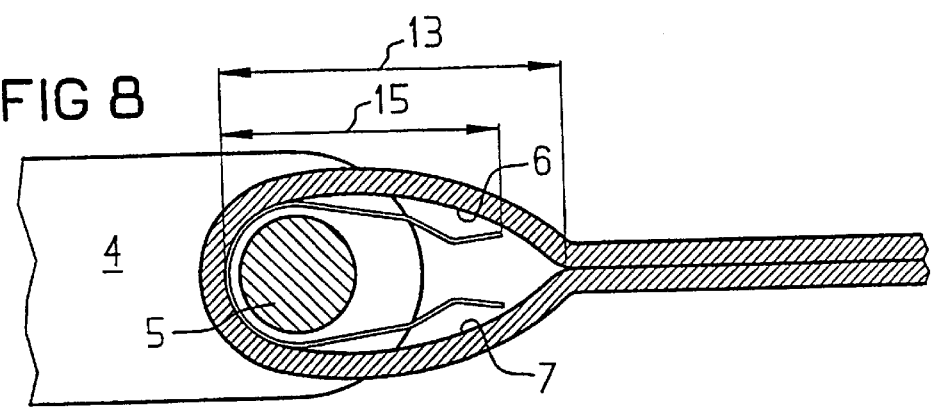
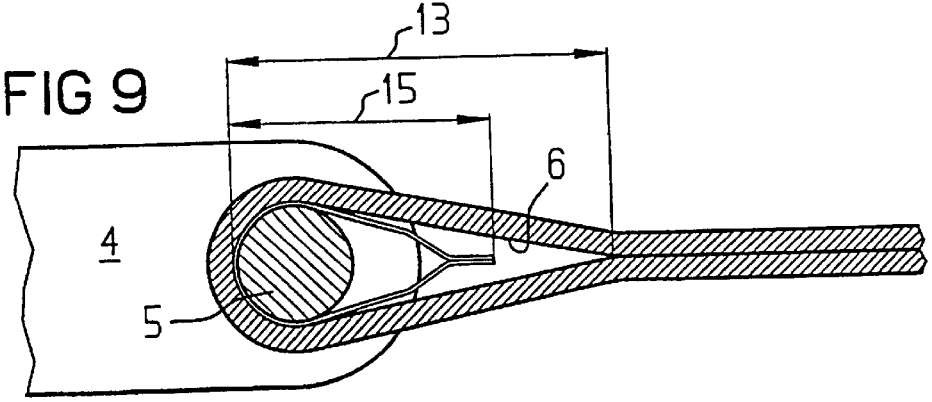

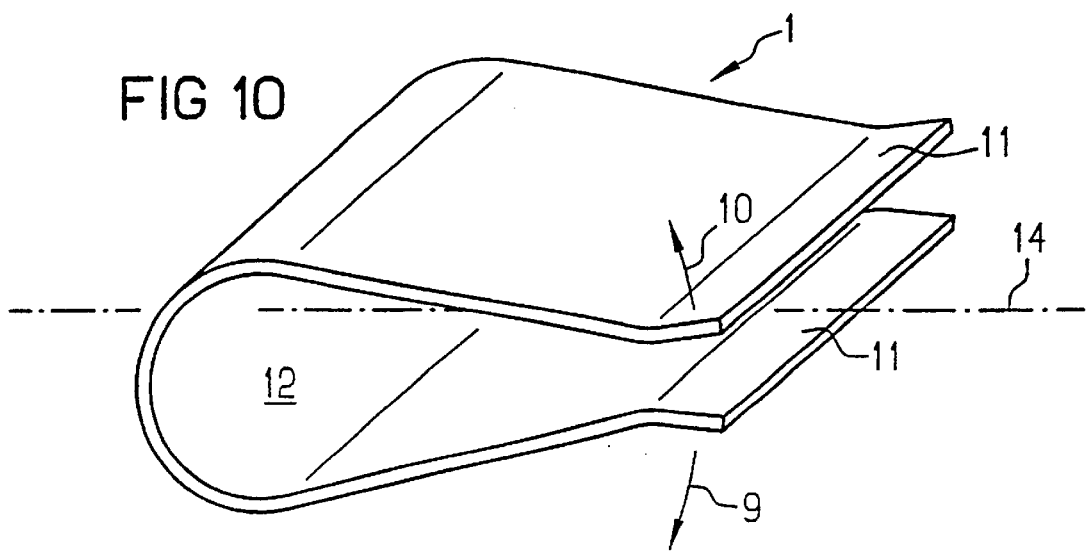
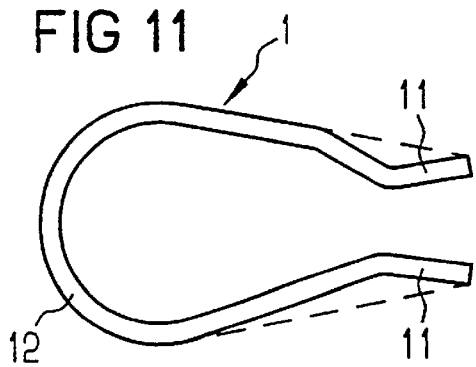
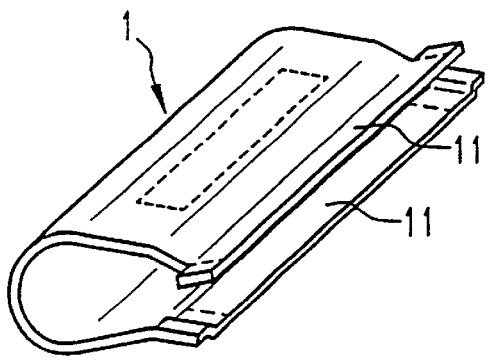
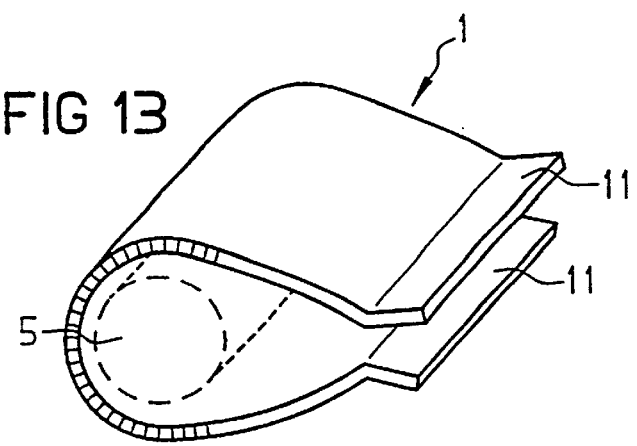

LOAD INDICATOR ON TRACTION ELEMENTS

DESCRIPTION

The invention relates to load indicators for indicating tensile stresses on traction elements, for example lashing belts or lashing cables. For the sake of simplicity, these traction elements are referred to hereinafter as "belts" or "belt." They are provided with a loop or eyelet for securing an adaptation part that introduces a counter-holding force to the traction element. The adaptation part can be, for example, the stud of a shackle or the stop pin of a bracing ratchet.

In lashing or bracing elements, a load indicator of this type serves to indicate visually to the user which load is present, and particularly whether a hazardous situation must be remedied. During the transport of lashed loads, for example on trucks, the load shifts from time to time due to external forces. This shifting often causes severe stress to the lashing element, which can pose a threat to the operator when the load is removed. Conventionally, load indicators are mounted with ratchet spanners; these indicators preferably serve to indicate the prestress force during lashing, but can also give a warning indication of a stress of the lashing that has occurred due to load shifting. Because of their complicated design, these load indicators are relatively costly.

GB 2 255 109 A discloses a load indicator that has the features of the preamble to claim 1. In this device, which is specified for cables, the indicator body is formed by a cable eye stiffener that has been modified for this purpose. In a simple version of this load indicator, the cable eye stiffener, which is closed all the way around, is provided in the region of its ring shape that faces the tip of the teardrop shape of the loop, and is no longer acted upon by the inside flanks of the loop, with a radial slit that allows the stiffener legs that rest against the inside flanks of the loop some play in the direction toward one another. This small amount of play gives the legs of the stiffener, which is relatively rigid due to its house-shaped cross section, an elastic mobility in the direction toward one another in a high-stress region. A mechanical indicator makes the magnitude of this movement recognizable, and consequently. permits conclusions about the load status. This load indicator is only suited for indicating high-load statuses. It is relatively imprecise and, furthermore, fairly structurally complex.

A load indicator known from GB 2 223 102 A, which only functions similarly to the aforementioned indicator, has a specially-shaped molded body that surrounds the traction pin over 360° between the loop of the traction element and the stud of a shackle that extends into the loop, the molded body being deformable under a load. The degree of deformation that occurs under a load is used in the manner of an expansion-measuring device as an indicator for the present load.

In contrast, it is the object of the invention to embody a load indicator of the type defined in the preamble to claim 1 such that it even indicates low load forces, and is therefore effective over the entire load range of the traction element. Moreover, it is intended to be manufactured inexpensively and reliably indicate dangerous tensile-force situations. This solution is based on the deformation that only the loop or eyelet, which has widened slightly under zero load, experiences under a load due to the increasing approximation of the teardrop cross-section shape, and its expansion. These belt loops or belt eyelets have an approximately teardrop-shaped outline, with the tip of the drop pointing in the belt direction under a load, when the adaptation part extending into the belt eyelet introduces the counterforce. Usually, belt eyelets or belt loops are formed in that the belt generally representing the term "traction element" is shifted at one end by 180 degrees and, in this relocated position, the belt end is fixed directly on the belt, or, in the case of a cable as the traction element, is spliced with the cable. As the tensile stress increases, the teardrop shape becomes more distinctly formed, because the inside flanks of the belt loop or belt eyelet approach one another. The degree of this approach is visually more easily recognizable due to the load indicator than in the case of mere inspection of the belt loop or belt eyelet. One embodiment characterizes an especially simple embodiment of the load indicator. In a different embodiment, the ends of the indicator body are not in direct contact with the belt. Another emobodiment improves the recognition of the distance between the legs. Another variation makes it possible to identify intermediate loads between no load and a hazardous load. This makes different load levels more clearly recognizable.

BRIEF DESCRIPTION OF THE DRAWINGS:

The invention is described in detail by way of embodiments. Shown are in:

FIGS. 1–5 different embodiments of load indicators or indicator bodies in a respective insertion position at a belt loop or belt eyelet, in the left column entitled A, which represents the no-load, inoperative state, and in the right column entitled B, which represents the dangerous-load state, respectively;

FIG. 6 a longitudinal section, extending in the belt direction, through a belt connection analogous to FIG. 3;

FIG. 7 a plan view in the arrow direction VII of the ensemble according to FIG. 6;

FIG. 8 a modified embodiment of the load indicator in the no-load, inoperative state;

FIG. 9 the embodiment according to FIG. 8, in the dangerous load state;

FIG. 10 an indicator body;

FIG. 11 a different indicator body;

FIG. 12 a view in perspective of the indicator body according to FIG. 11;

FIG. 13 a view in perspective of the indicator body according to FIG. 10, with an inserted adaptation part;

c=⅔ intermediate load, d=dangerous load.

Figure 16:
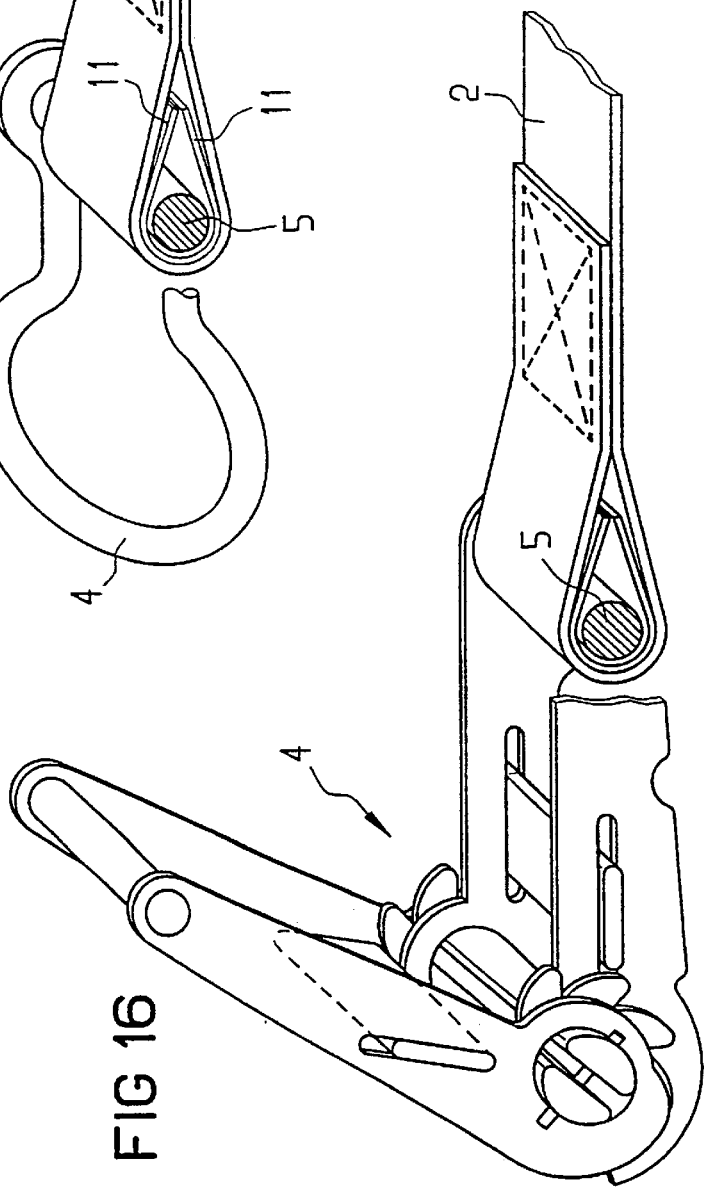

FIG. 16 a secured ratchet spanner as the carrier of the adaptation part; and

Figure 17:
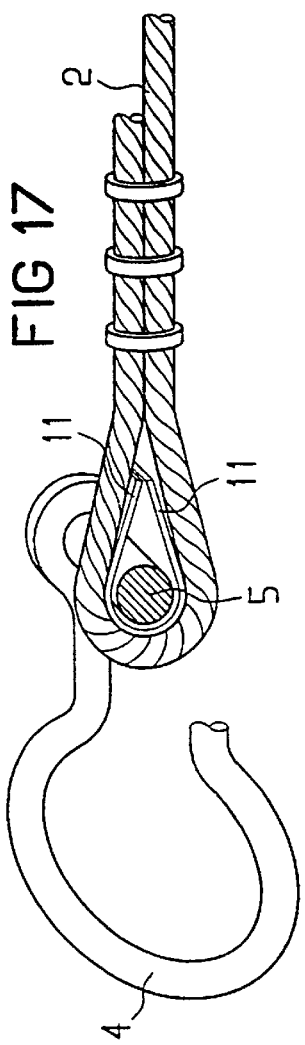
Figure 18:
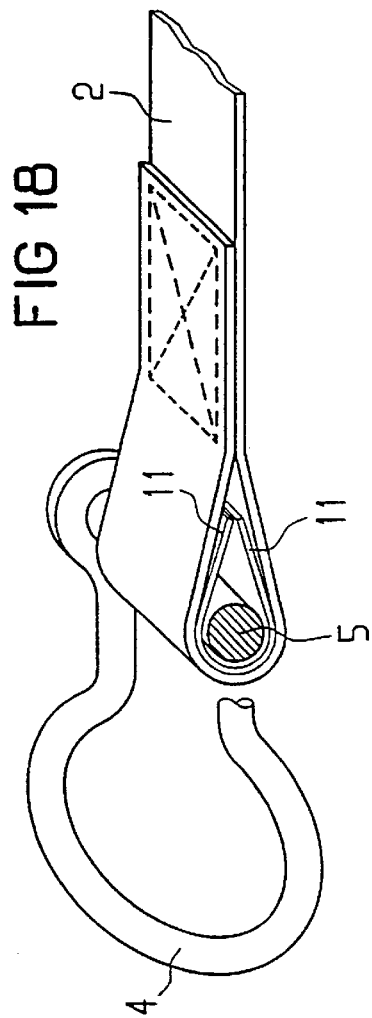

FIGS. 17 & 18 a secured shackle as the carrier of the adaptation part.

The load indicator 1 serves to indicate tensile stresses on traction elements, which are referred to hereinafter as "belt" 2 for short, but generally represent different types of traction elements such as lashing belts or lashing cables, sling bands and the like. The belt 2 is provided at one end with a loop or eyelet 3 for securing or suspending an adaptation part 4, which is typically formed by a pin 5 that preferably has a circular cross-section shape and extends through the belt eyelet 3 to fix its position. Instead of a pin 5, a bow or a pin-like connecting part having a cross-section shape other than a circle can be used.

The load indicator or indicator body 1 is disposed next to the pin 5 in the belt eyelet 3. The arrangement is situated on the side of the tip of the teardrop-shaped belt eyelet 3, so the load indicator 1 is not directly impacted by the tensile load. The pin 5, in contrast, rests against the belt eyelet in the wrap corresponding to the rounding of the teardrop shape. This is also the case for an adjacent positioning of the indicator body 1 and the pin 5, corresponding to FIGS. 1 and 2. In the case of FIG. 1, the indicator body is a one-piece molded part comprising a resilient material in the embodiment as a ring segment having a C-shaped cross section, with a C-shaped opening that faces the side of the traction element, that is, the tip of the teardrop shape. In the case of FIG. 2, the indicator body comprises several parts. Here, it includes two end pieces 16, 17, which rest against the inside flanks 6, 7 of the belt eyelet 3, with an interposed compression spring 18 as an elastically-compressible medium.

The preferred embodiment of the indicator body 1 as a one-piece annular segment that has a C shape in the no-load position has legs or leg ends 11, which project toward the side of the traction element, at its ends that limit the C opening. In the embodiment according to FIGS. 8 through 14, the leg ends 11 are bent or angled in spreading directions 9, 10 that are oriented away from one another. Because of the spreading effect they exert under a zero load, the leg ends press against the inside of the belt eyelet, thereby acting on the inside flanks 6, 7 of the loop or eyelet 3.

Because of the compact design, the combination of a pin 5 as the fixing element 4 with the one-piece indicator body 1 in-a cooperative arrangement, as shown in FIGS. 4 through 9 and 13, is especially advantageous. In this case, the pin 5 is inserted in the manner of a shaft into the ring-segment-like indicator body 1 having a C shape in the no-load state, and acts upon the concave side of the indicator body 1 under tensile stress. Consequently, the belt eyelet 3 can have a conventional size without impeding the recognizability of the indication.

The cross section of the indicator body 1 also approximates the Greek capital letter Ω. It is bent from a metallic spring-steel sheet, but can also be produced from plastic in an injection-molding process. The indicator body is simple to manufacture because of the approximately-rectangular cross section of its ring-curve head 12 and its legs. The cross-section shape can, however, also be hollowed out in the manner of a cable eye stiffener, and then be in a form fit with the belt eyelet 3.

Figure 14:
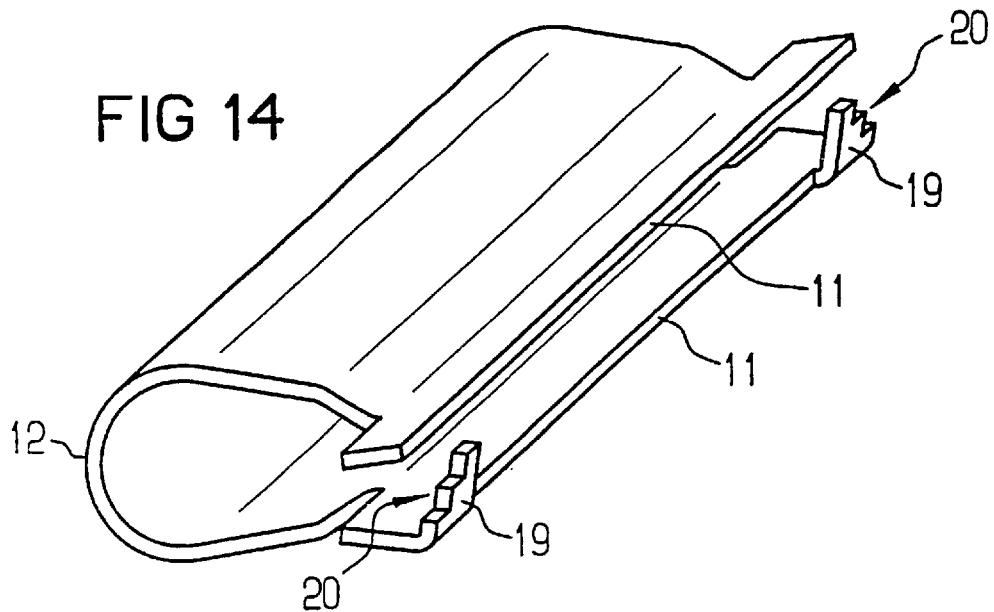
FIG. 14 a modified indicator body, similar to those according to FIGS. 10 through 13.
Figure 15A:
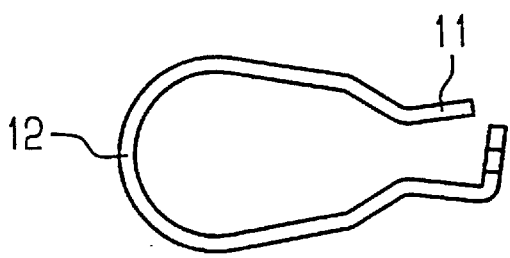
FIG. 15 a side view of the indicator body according to FIG. 14, under different loads, namely a =no-load, inoperative state, b=⅓ intermediate load.
Figure 15B:
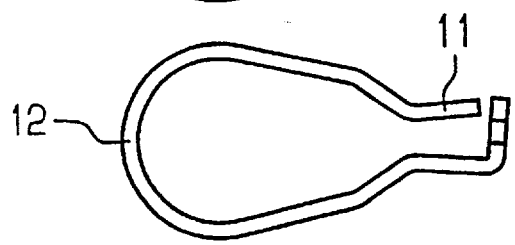
Figure 15C:
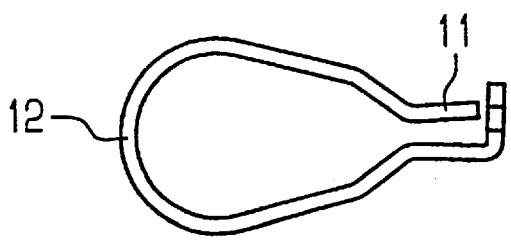
Figure 15D:
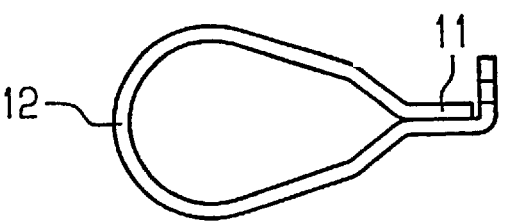

The indicator body according to FIG. 14 has at its lower leg end 11 viewing tabs 19, which project in the direction of the upper leg, and extend so as to overlap the end of the upper leg in the no-load position (FIG. 15a) The viewing tabs 19 are simply angled parts of the indicator body 1. The tabs are graduated in the manner of a staircase at their side edges, which are clearly visible from the outside in the inserted position. The individual steps of this staircase 20 constitute the load indicator. The overlapping of each step with the upper leg end 11 of the indicator body 1 indicates a different load. The threat posed by the different load steps can also be signaled by different colors.

The cross-section thickness of the pin 5 for securing or suspending the belt 2 equipped with the indicator body 1 is smaller than the inside diameter of the head 12 of the indicator body 1, the head resembling a curved-ring segment, so, in the case of an overload that enters the dangerous range, a diameter contraction with respect to the pin 5 is possible, in which the leg ends 11 are compelled to approach one another, that is, come into contact with one another (FIGS. 9, 15). This very contact indicates a dangerous situation. The compression of the effective diameter of the ring-curve head can be adapted to certain magnitudes of stress through corresponding dimensioning of the spring clip. In this way, the distance measure 8 is a readily-recognizable visual indicator for the load state of the belt 2 or the loop 3, that is, for the possible existence of a dangerous situation.

If the load indicator has not yet been loaded, the legs assume a spread position (FIG. 8), in which their leg ends 11 rest against the belt eyelet 3 from the inside, and spread it slightly. Under a load, the belt eyelet 3 presses in the radial direction against the head 12 of the ring curve. In the process, the indicator body 1 embodied as a clip is supported against the pin 5, and stresses the head 12 of the ring curve, thereby bending it. The clip 1 reacts to the stress like a surface-stressed spiral spring. The deformation of the head 12 of the ring curve changes the position of the leg ends 11, which approach one another and, under a dangerous load, can even touch one another.

Referring now to FIGS. 8 and 9, the belt-eyelet length 13, measured in the load direction of the traction element 2, is greater than the length 15 of the indicator body 1, measured in the direction of the center longitudinal axis 14. Preferably, the length of the indicator body 1 is between 50 and 80 percent of the non-loaded belt-eyelet length 13.

LIST OF REFERENCE CHARACTERS

1 Indicator body
2 Belt
3 Belt eyelet
4 Adaptation part
5 Pin
6 Inside flank
7 Inside flank
8 Distance measure
9 Spreading direction
10 Spreading direction
11 Leg end
12 Ring-curve head
13 Belt-eyelet length
14 Center longitudinal axis
15 Length
16 End piece
17 End piece
18 Compression spring
19 Viewing tab
20 Staircase

What is claimed is:

1. A load indicator to indicate tensile stress in a flat web, one end of which flat web is formed into a closed loop in order to receive a connecting part in the bite of the loop, which loop has two opposing flanks that extend from said bite so that said loop assumes an increasing elongated teardrop shape as said web is placed under increasing tension, said load indicator comprising: a generally U-shaped member, made of a single flat piece of resilient material with a closed end and two opposed legs extending from said closed end; with the closed end of the U-shaped member disposed in said bite, the two legs of said U-shaped member are resiliently biased away from each other and into at least partial contact with said flanks so that, as said web is placed under increasing tension, said two legs move toward one another providing a visual indication of tension in said web.

2. The load indicator according to claim 1, characterized in that the legs have ends (11) being bent or angled in spreading directions (9, 10) that are oriented away from one another.

3. The load indicator according to claim 1, characterized in that the U-shaped member (1) is bent from a metallic spring-steel sheet.

4. A load indicator as in claim 1 wherein said two legs expand said loop when said flat web is not under stress.

5. The load indicator according to claim 1, wherein said web is a traction element having a length and being adapted to be exposed to a load having a load direction parallel to the length of the web; wherein said loop and said U-shaped member each have a length extending parallel to the length of the web; and further wherein the length of said loop is greater than the length of said U-shaped member.

6. The load indicator according to claim 5, wherein the loop has a non-loaded state; and further wherein the length of the U-shaped member is between 50 and 80 percent of the length of the loop in the non-loaded state thereof.

7. The load indicator as defined in claim 1, further comprising a viewing tab mounted on one of said legs and extending toward the other of said legs; said U-shaped member having a non-loaded state in which said viewing tab overlaps said other leg.

8. The load indicator as defined in claim 7, wherein said viewing tab is provided with a graduation.

9. The load indicator as defined in claim 8, wherein said graduation comprises at least one stepped edge.

10. The load indicator as defined in claim 1, wherein said U-shaped member has a rectangular cross section.

\* \* \* \* \*